(No Model.)

G. KELLER.
CAR FENDER.

No. 537,610. Patented Apr. 16, 1895.

Witnesses
D. Bogdanoff
D. Petri-Palmedo

G. Keller, Inventor
By his Attorney
Oscar F. Gunz

UNITED STATES PATENT OFFICE.

GOTTLIEB KELLER, OF WEST HOBOKEN, NEW JERSEY, ASSIGNOR OF SEVENTEEN-TWENTIETHS TO JOHN HENRY ASTRUCK, OF NEW YORK, N. Y.

CAR-FENDER.

SPECIFICATION forming part of Letters Patent No. 537,610, dated April 16, 1895.

Application filed December 13, 1894. Serial No. 531,620. (No model.)

*To all whom it may concern:*

Be it known that I, GOTTLIEB KELLER, a citizen of Switzerland, and a resident of West Hoboken, in the county of Hudson and State of New Jersey, have invented certain new and useful Improvements in Car-Fenders, of which the following is a specification.

This invention relates to improvements in fenders for electric, cable and other motor cars.

The object of my invention is to provide a new and improved car fender which is so constructed that when a person is struck by the same he is thrown upon the fender and prevented from falling upon the rails or the pavement or ground between the rails, and which fender operates automatically, is strong and durable, can easily be applied on any car and is not expensive.

The invention consists in the combination with a car, of a fender having its top part guided to move vertically on the front of the dash board and a spring for drawing the bottom part of the fender toward the dashboard.

The invention also consists in the construction and combination of parts and details as will be fully described and set forth hereinafter and finally pointed out in the claims.

Figure 1:
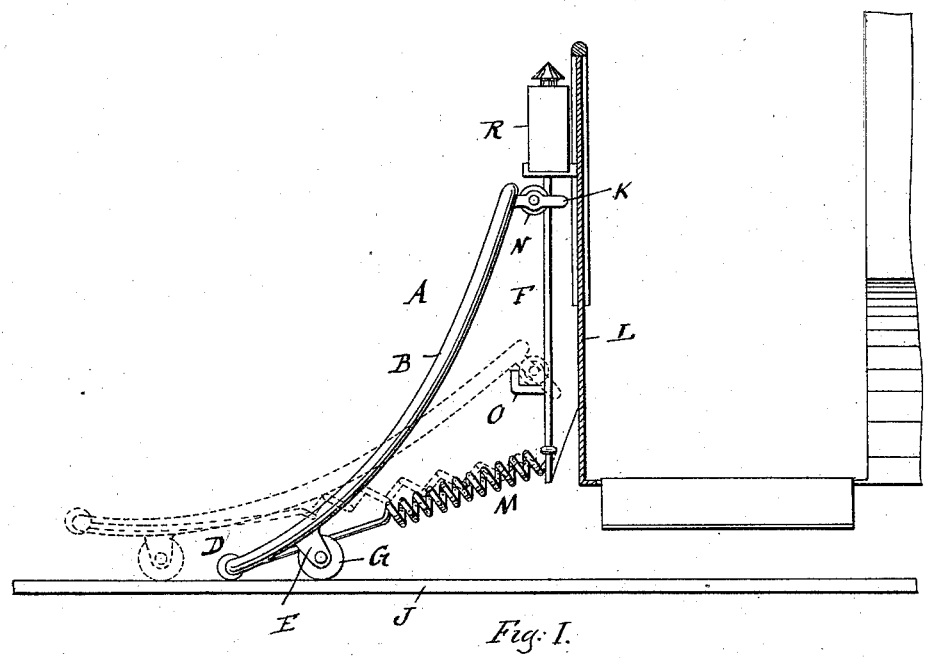
Figure 2:
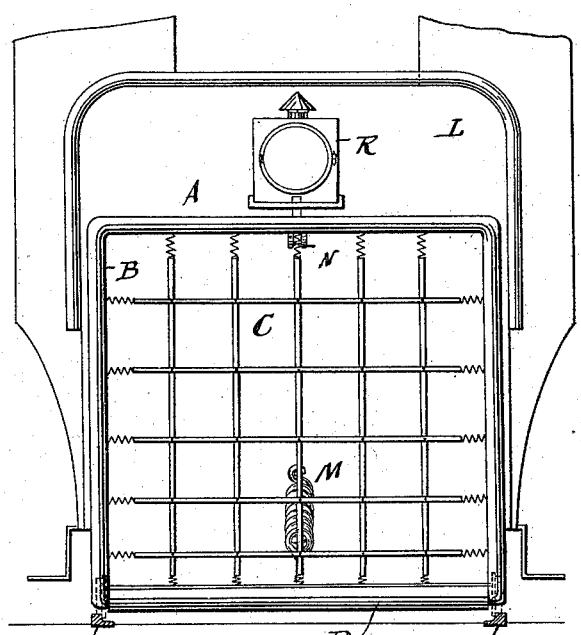

In the accompanying drawings, forming a part of this specification, and in which like letters of reference indicate like parts in both the figures, Figure 1 is a side view of the end part of a car and my improved fender on the end of the same, the fender being shown in two different positions. Fig. 2 is a front view of the fender and an end view of the lower part of the car.

The fender A, is constructed with a strong body frame B, preferably made of tubing, and curved about as shown. A series of longitudinal and cross bars C, are secured to the frame B, to form an elastic or slightly yielding support for the body that is caught by the fender, so that the shock does not break any bones or bruise the body or limbs. The bottom cross bar D, of the frame B, is padded and provided with a leather or rubber covering. Each side bar of the frame B, is provided a short distance above the lower end and on the under side with jaws E, in which a small wheel G is mounted to turn, which wheel runs on the track rails J.

The frame B, is provided on its top cross bar at the rear with an elongated eye K, through which passes a vertical rod F, fixed on the front dash board L a short distance in front of the same, so that the said eye K, is guided to move vertically on said rod. To reduce friction and prevent binding, a roller N is mounted at the inner end of the eye K to roll on the front of said rod. A stop lug O, on the rod F, prevents the eye K and the upper part of the fender from descending too far.

A helical spring M, has one end attached to the bottom cross bar of the fender and the opposite end to the lower part of the rod F, so as to pull the bottom part of the fender toward the dash board and hold the fender in the normal position shown in full lines in Fig. 1.

R, is the head light.

The operation is as follows: The fender is normally in the position shown in full lines in Fig. 1. In case a person is struck by the bottom cross bar D of the fender he is thrown toward the dash board and falls upon the fender, one of the cross bars or frame bars of which he can readily grasp to obtain a firm hold, which a person will instinctively do. As the weight of the person rests mainly upon that part of the fender, to the rear of the wheels G, this weight causes the rear part of the fender to descend whereby the front end is moved forward and raised slightly forming a kind of scoop which holds the person. The tension of the spring M, is such as to permit it, to be extended readily when a person falls upon the fender, but at the same time its tension is sufficient to hold the fender in the normal position. In case a person falls across the track, the bottom bar of the fender will push the body along the front of the fender or to one side, until the car is stopped and in no case can the body come in contact with the wheels of the car.

Having thus described my invention, what I claim as new, and desire to secure by Letters Patent, is—

1. The combination with a car, of fender having its top guided to move vertically on the dash board, wheels on said fender running on the track rails and serving to support the fender a short distance back of the front lower end and a spring for drawing the lower front end of the fender toward the front of the car, substantially as herein shown and described.

2. The combination with a car, of a rod held vertically on the front of the dash board, a fender, a guide eye on the top of the fender, through which eye said rod passes, and a spring for drawing the bottom part of the fender toward the dash board, substantially as herein shown and described.

3. The combination with a car, of a rod held vertically on the front of the dashboard, a fender, a guide eye on the top of said fender, through which eye said rod passes, a stop lug on the bottom part of said rod and a spring for drawing the bottom part of the fender toward the dashboard, substantially as herein shown and described.

In testimony that I claim the foregoing as my invention I have signed my name, in presence of two witnesses, this 6th day of December, 1894.

GOTTLIEB KELLER.

Witnesses:
OSCAR F. GUNZ,
DAVID BOGDANOFF.